SIGN DETECTOR

Filed March 25, 1965

INVENTORS
EARL D. JACOBS
WILLIAM H. QUICK
BY [signature]
ATTORNEY

SIGN DETECTOR

Filed March 25, 1965

INVENTORS
EARL D. JACOBS
WILLIAM H. QUICK
BY
ATTORNEY

United States Patent Office 3,428,816

Patented Feb. 18, 1969

3,428,816
SIGN DETECTOR

Earl D. Jacobs, Tustin, and William H. Quick, La Mirada, Calif., assignors to North American Rockwell Corporation, a corporation of Delaware Filed Mar. 25, 1965, Ser. No. 442,648
U.S. Cl. 250—218 5 Claims
Int. Cl. G01n *21/26*

ABSTRACT OF THE DISCLOSURE

A device for detecting the amplitude and sign difference between two laser beams wherein the optical path length of one laser beam is modulated and then compared against the second beam which has been modulated by a gas cavity which changes its index of refraction upon sensing acceleration. The two modulated laser beams are then frequency detected and demodulated to determine both the sign and amplitude of the frequency difference between the two beams.

This invention relates to a device for detecting the frequency difference between two laser beams and more particularly to a device for detecting the amplitude and sign difference between two optical frequencies by modulating the optical path length of one laser beam and then comparing the modulated beam against a second beam that has been modulated by a gas cavity which changes its index of refraction upon sensing acceleration. The two modulated beams are then frequency detected and demodulated to determined both the sign and the amplitude of the frequency difference between the two beams.

In a co-pending patent application Ser. No. 442,100 filed Mar. 23, 1965, in the names of Earl D. Jacobs and Wilbur L. Zingery, entitled "Accelerometer," there is described an accelerometer utilizing two lasers containing a common gas cavity within their resonant path. Sensed acceleration increases the gas density on one side of the common gas cavity while decreasing it on the other side. This results in an increase in the index of refraction on one side with a corresponding decrease on the other side. The change in the index of refraction of the gas cavity produces a change in the optical path lengths and, therefore, in the resonant frequencies of the lasers. Devices are available for detecting the absolute difference in the frequency between the two beams, but a simple, inexpensive means is neeeded to determine the sign of this difference.

The device of this invention provides a means for determing the sign of the difference by combining, through partially silvered mirrors, the light beam outputs from the lasers and applying the beams to an optical sensor which produces a strong electrical signal when the light beams are in-phase and a weak or null signal when they are out-of-phase. The frequency on one of the lasers is modulated by applying a modulating signal to a transducer whose optical path length controls the resonant path of the laser. A frequency detector and a demodulator then permit the determination of the sign of the frequency difference. The sensor also responds to the light beams to form a beat signal with a voltage which oscillates at the difference of the two light-wave frequencies. This frequency difference is proportional to the magnitude of sensed acceleration.

It is, therefore, an object of the present invention to provide a means for determining the sign of the frequency difference between two optical beams.

It is another object of this invention to provide a means for detecting the sign of the difference between two laser beams by modulation.

It is a further object of this invention to provide a novel means for determining the sign and magnitude of the difference between modulated laser beams.

It is a more general object of this invention to provide a means for determining the amplitude and polarity difference between two optical beams.

These and other objects and advantages of this invention will become more apparent by reference to the following description taken in conjunction with the accompanying drawings, in which.

Figure 1:
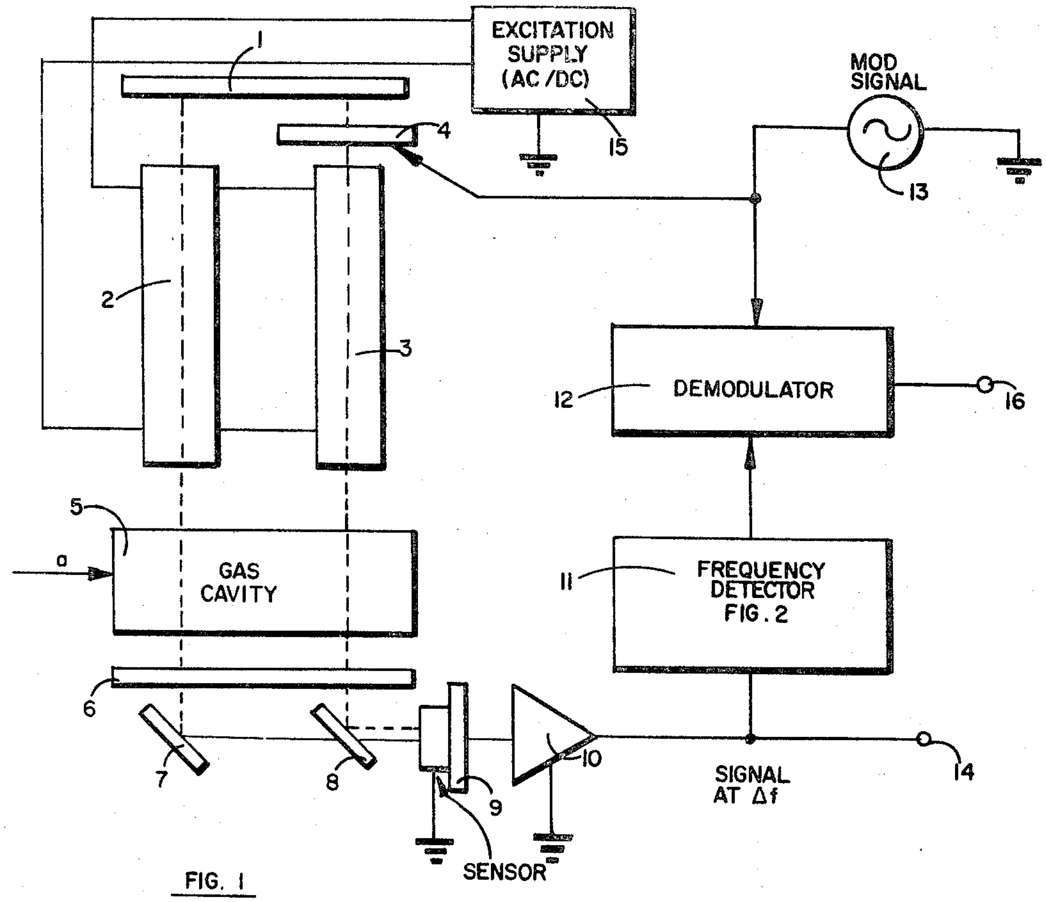
FIG. 1 is a block diagram illustrating the gas laser accelerometer and the means for determining the direction and amplitude of sensed accelerations.

Referring to FIG. 1, totally reflecting mirror (fully-silvered) 1 and partially reflecting mirror (half-silvered) 6 define an optical resonant cavity for a gas laser. Contained within the resonant cavity are laser materials 2 and 3. These materials may be either a solid, such as a ruby, or a gas mixture, such as helium and neon. Interposed in the optical path length of each of these lasers is gas cavity 5. Accelerations sensed along axis *a* will cause a pressure gradient within the gas cavity 5, which in turn will bunch gas molecules to one end of the cavity changing the index of refraction seen by the laser beams. This change in the index of refraction is proportional to the density of the gas. If an acceleration is applied in a direction as shown by the arrow labeled *a*, the gas density on the left side of the cavity will increase, while on the right side it will decrease. This results in an increase in the index of refraction on the left side with a corresponding decrease on the right side. This change produces a change in the optical path lengths and, therefore, in the resonant frequencies of the lasers.

Figure 2:
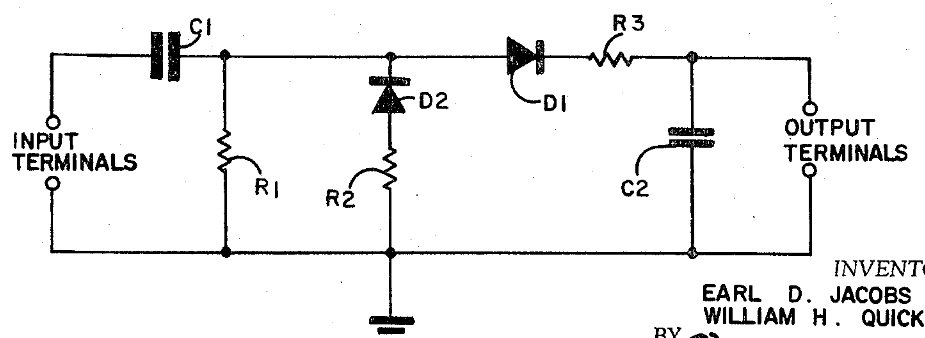
FIG. 2 is a schematic illustration of a frequency detector for use with this invention.

Mirror 7 reflects the partially transmitted beam from laser material 2 through partially reflective mirror 8 onto sensor 9. Mirror 8 reflects a part of the laser beam from laser material 3 onto sensor 9. Sensor 9, which may be a standard photo-sensitive material, produces a strong electrical signal when the light beams are in-phase and a weak signal when they are out-of-phase. Amplifier 10 amplifies the output of optical sensor 9. Frequency detector 11 is connected to sense the output of amplifier 10 and provides a frequency detected output to demodulator 12. Transducer 4, which may be a Kerr cell, is inserted into the optical path length of laser material 3. Modulating signal generator 13 is connected to provide a modulating signal to transducer 4 and to demodulator 12. Excitation supply 15, which may be either an AC or DC supply, is connected to laser materials 2 and 3 to excite the material. In operation the laser material is brought into a condition of negative absorption for some predetermined frequency by excitation supply 15. As a result of spontaneous and stimulated emission, light is generated within the laser resonant cavity. The generated light travels the length of the laser material and is reflected back and forth between reflectors 1 and 6. Partially reflected material 6 allows a portion of the light to leave the cavity and be used for sensing purposes. Sensor 9, not being able to detect the extremely high light-wave frequencies, responds to the beat signal with a voltage which oscillates at the difference of the two light-wave frequencies. This frequency difference is proportional to acceleration; however, there is no means of detecting which laser has the higher frequency and, therefore, no means for detecting the direction of the acceleration. Therefore, the frequency of one laser, laser 3, is modulated by applying the modulating signal from modulating source 13 to transducer 4 whose optical path length is thereby controlled. Frequency detector 11 and demodulator 12 then permit the determination of the sign of the frequency difference by comparing the phase of the frequency-difference-signal modulation wtih that of the modulating signal. The frequency detector may be a circuit such as is shown in FIG. 2. The initial RC pair consisting of R1 and C1 differentiates the output signal of amplifier 10 such that the amplitude of the signal following it is proportional to frequency, which is subsequently rectified and filtered by means of diodes D1 and D2, resistors R2 and R3, and capacitor C2.

Figures 3, 4:
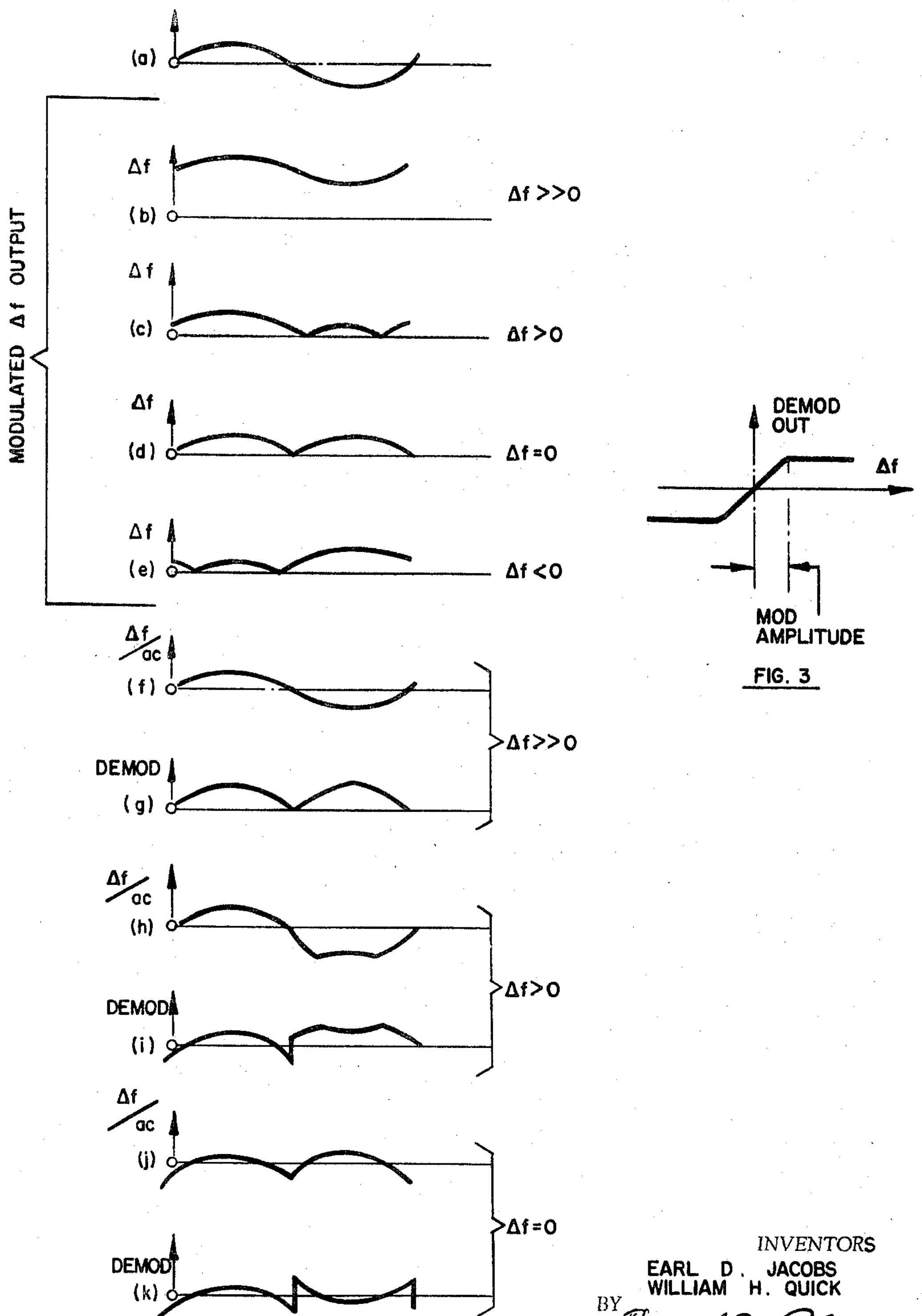
FIG. 3 is a response curve of a typical demodulator which may be utilized with this invention.
FIG. 4 illustrates wave forms present in the sign detector under various operating conditions.

Referring to FIG. 4, wave form (*a*) is the input wave to the optical sensor 9. The wave form of the output of amplifier 10, at terminal 14 for different levels of the difference frequency, is shown in wave forms (*b*) through (*e*). Negative output values are not obtained in these wave forms because optical sensor 9 responds only to the amplitude and thus rectifies the beat signal of the two laser outputs. For difference frequencies a little greater than zero and a little less than zero, the wave form at the output of the frequency detector is basically the same except for the timing relative to the modulation signal. Before demodulation, the DC component of the difference-frequency signal is filtered out. It is seen that that for relatively large frequency differences, the maximum signal is obtained. When the frequency difference falls to the level where the modulation carries part of it to the negative region, the demodulated output begins to decrease. When the frequency difference equals zero, a symmetrical demodulator-output wave form exists and the average demodulator output is zero. The response of the demodulator is shown in FIG. 3. The demodulated output is essentially constant for all frequency differences larger than the modulating amplitude, because of the AC component which is demodulated does not change. A small modulating amplitude, therefore, helps give a sharp indication of the sign of the difference frequency. A lower limit for usable modulating amplitude, however, results from reliability considerations in the presence of inevitable noise on the signal.

Referring back to FIG. 4, wave forms (*f*), (*h*) and (*j*) correspond to (*b*), (*c*) and (*d*) for varying differences in frequency to the input sensed by the demodulator. Wave forms (*g*), (*i*) and (*k*) correspond to the wave forms present on output terminal 16 of the demodulator.

It wil be aparent to those skilled in the art that many variations, modifications and applications of the invention in addition to those specifically mentioned herein can be made without departing from the principles of the invention. The invention, therefore, is not to be construed as limited except as defined in the following claims.

We claim:

1. Apparatus for measuring the sign of the frequency difference between two laser beams comprising:

means for frequency modulating one of said laser beams;

photo detector means upon which said one beam and the other of said beams impinges;

frequency detector means responsive to said photo detector means for providing a signal which is proportional to the difference in frequency between said two beams;

demodulation means responsive to said frequency modulating means and said provided signal for determining the difference in frequency between said provided signal and said modulating signal so as to provide a signal indicative of the sign of said last named difference.

2. Apparatus for measuring the sign of the frequency difference between two optical beams comprising:

means for frequency modulating one of said optical beams;

photo detector means upon which said modulating beam and said other beam impinges, providing a beat signal proportional to the difference between the two optical beam frequencies;

frequency detector means responsive to the output of said photo detector means for providing a signal which is proportional to frequency;

demodulation means responsive to said frequency modulating means and said provided signal for comparing the frequency of said provided signal with the frequency of said modulating signal to provide a signal indicative of the sign of the difference between said last named frequencies.

3. The device as claimed in claim 2 wherein said frequency detector means comprises:

a differentiator for differentiating the output signal of said photo detector;

a rectifier for rectifying said differentiated signal;

a filter for filtering out the DC component of the difference in frequency of said optical beams so as to provide a signal proportional to frequency.

4. Apparatus for measuring the sign of the frequency difference between two frequency modulated laser beams comprising:

a modulating signal source;

transducer means, responsive to said modulating signal source, inserted in the optical path of one of said laser beams for modulating said beam;

a photo detector upon which said modulated beam and the other of said beams impinge;

amplifier means for providing an amplified signal proportional to the output of said photo detector;

frequency detector means responsive to the output of said amplifier for providing a signal which is proportional to the frequency of said amplified signal;

demodulation means responsively connected to said signal source and adapted to receive said frequency detected signal for determining the frequency difference between said signal source and said detected signal so as to provide a signal indicative of the sign of said last named difference.

5. Apparatus for measuring the sign of the frequency difference between two optical beams comprising;

means for frequency modulating one of said beams;

sensor means responsive to said optical beams for providing a signal proportional to the frequency difference of said optical beams;

means responsive to said modulating means for demodulating said frequency difference signal to provide a signal indicative of the sign of said frequency difference.

References Cited

UNITED STATES PATENTS

| | | | |
|---|---|---|---|
| 2,817,769 | 12/1957 | Siegler et al. | 250—220 |
| 3,073,168 | 1/1963 | Adams et al. | 88—14 |
| 3,092,736 | 6/1963 | Ernyei | 328—134 X |

JAMES W. LAWRENCE, *Primary Examiner.*

R. F. HOSSFELD, *Assistant Examiner.*

U.S. Cl. X.R.

250—220; 88—14